(12) United States Patent
Park et al.

(10) Patent No.: US 7,922,143 B2
(45) Date of Patent: Apr. 12, 2011

(54) SEAT MOVING TRACK ASSEMBLY

(75) Inventors: Gun Young Park, Incheon (KR); Bum Suk Oh, Incheon (KR); Sung Ha Park, Incheon (KR)

(73) Assignee: Austem Co. Ltd., Chungcheongnam-do (KR)

( * ) Notice: Subject to any disclaimer, the term of this patent is extended or adjusted under 35 U.S.C. 154(b) by 0 days.

(21) Appl. No.: 12/298,028

(22) PCT Filed: Jul. 17, 2008

(86) PCT No.: PCT/KR2008/004191
§ 371 (c)(1),
(2), (4) Date: Oct. 21, 2008

(87) PCT Pub. No.: WO2009/048220
PCT Pub. Date: Apr. 16, 2009

(65) Prior Publication Data
US 2010/0181460 A1    Jul. 22, 2010

(30) Foreign Application Priority Data
Oct. 9, 2007   (KR) .................. 10-2007-0101280

(51) Int. Cl.
*B60N 2/08* (2006.01)

(52) U.S. Cl. .............. 248/429; 248/424; 248/430
(58) Field of Classification Search ............ 248/429, 248/430, 424
See application file for complete search history.

(56) References Cited

U.S. PATENT DOCUMENTS

| | | | |
|---|---|---|---|
| 6,113,051 A * | 9/2000 | Moradell et al. | 248/430 |
| 7,600,802 B2 * | 10/2009 | Kojima | 296/65.13 |
| 7,758,008 B2 * | 7/2010 | Kojima et al. | 248/430 |
| 7,780,138 B1 * | 8/2010 | Lee et al. | 248/429 |
| 7,789,368 B2 * | 9/2010 | Yamada et al. | 248/430 |

FOREIGN PATENT DOCUMENTS

| | | |
|---|---|---|
| JP | 07-246868 | 9/1995 |
| JP | 2002-154356 | 5/2002 |
| JP | 2004-196140 | 7/2004 |
| JP | 1020060029520 | 4/2006 |
| JP | 2007-126037 | 5/2007 |

* cited by examiner

Primary Examiner — Anita M King
(74) Attorney, Agent, or Firm — Schmeiser, Olsen & Watts LLP

(57) ABSTRACT

The present invention improves the shape of a protruding part of a locking member which allows a lower stationary rail and an upper moving rail of a seat moving track assembly to be coupled with each other, thereby enabling a stable movement with a further simplified configuration component.

15 Claims, 6 Drawing Sheets

[Figure 1]
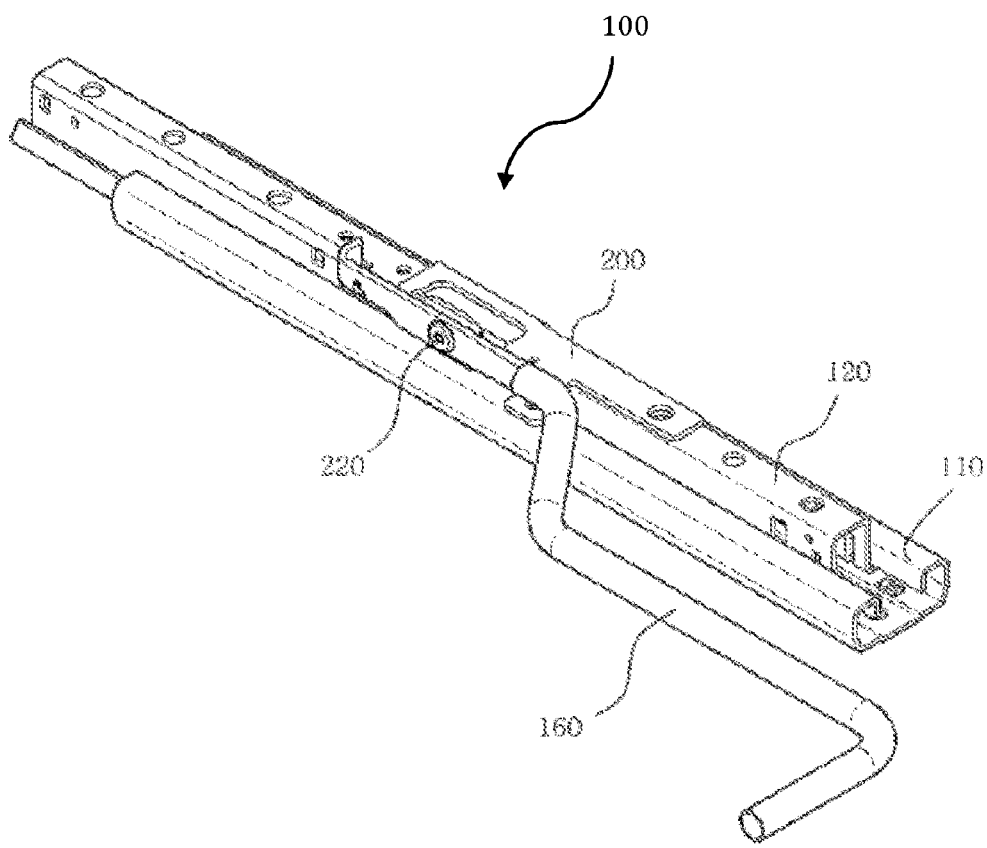

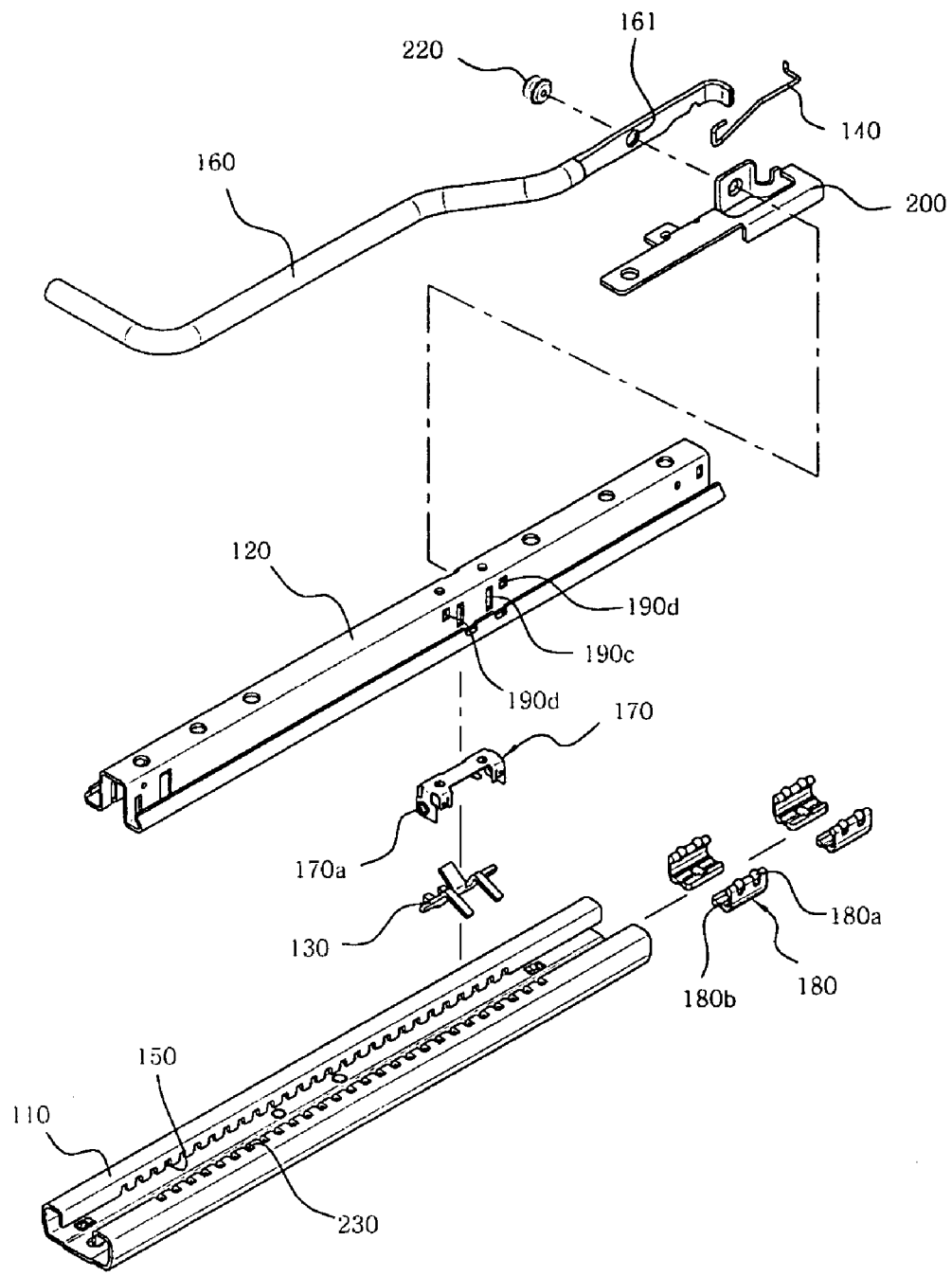
[Figure 2]

【Figure 3】
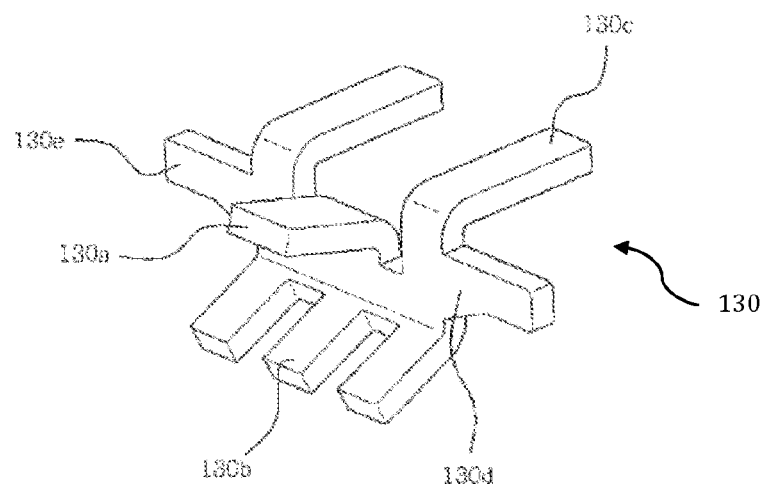
【Figure 4】
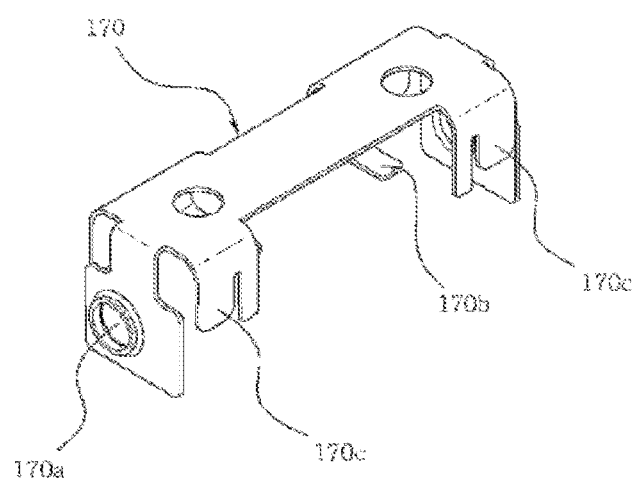

【Figure 5】
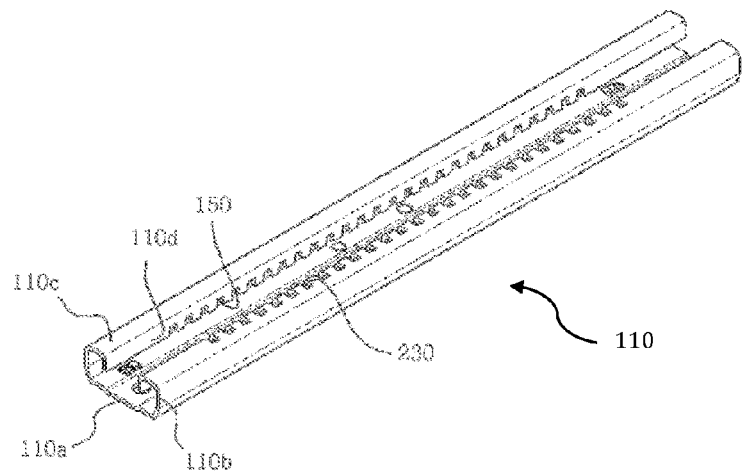
【Figure 6】
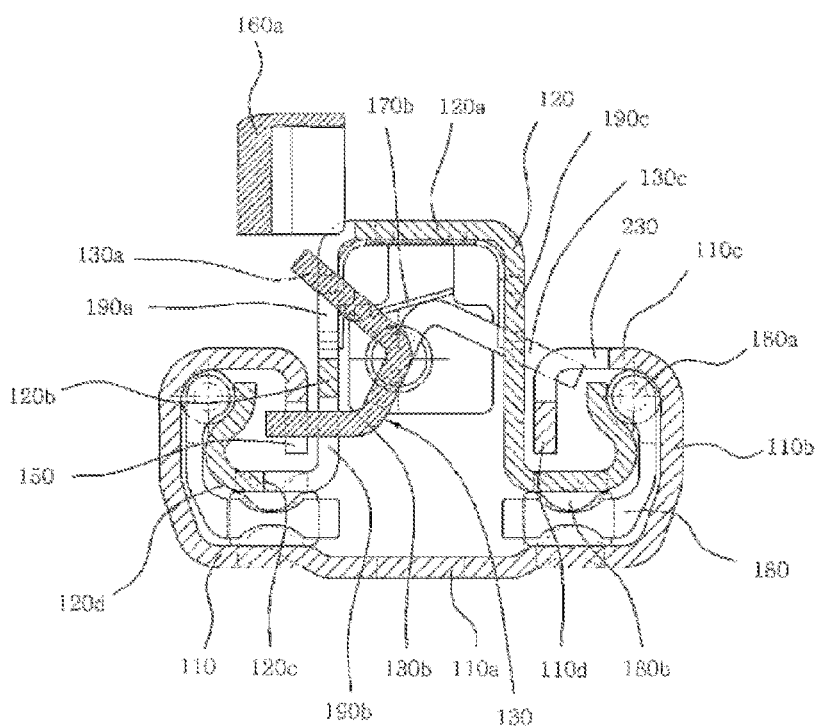

【Figure 7】
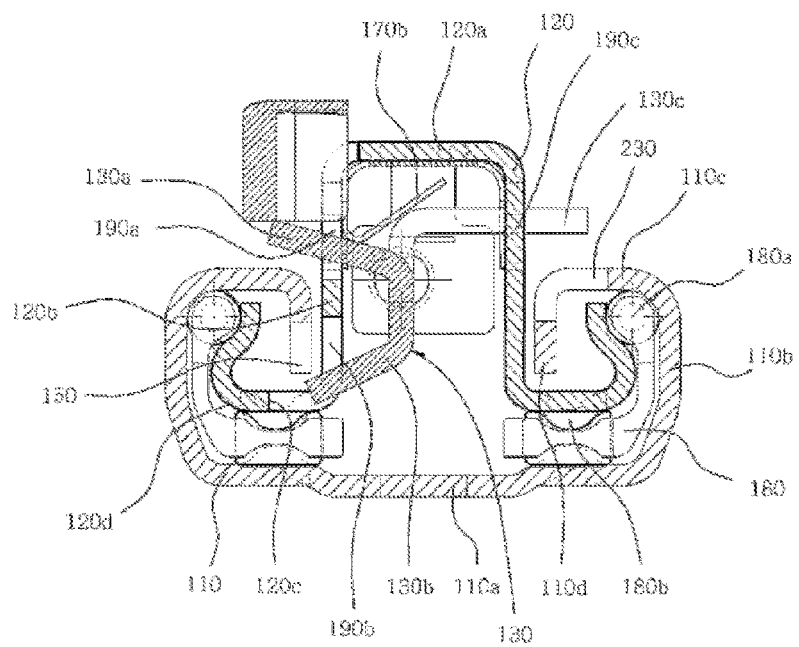
【Figure 8】
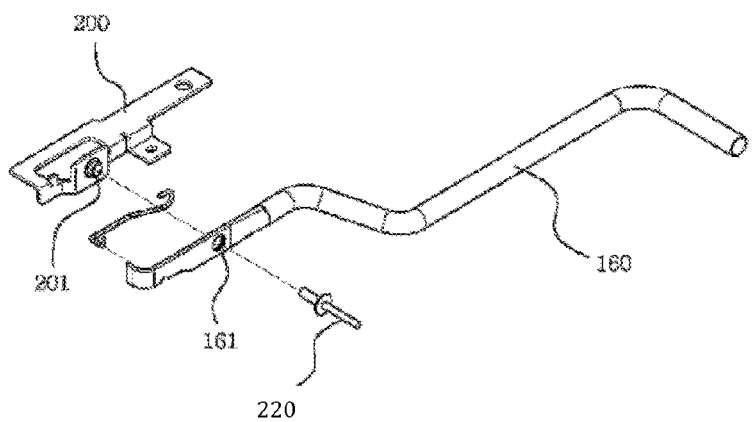

【Figure 9】
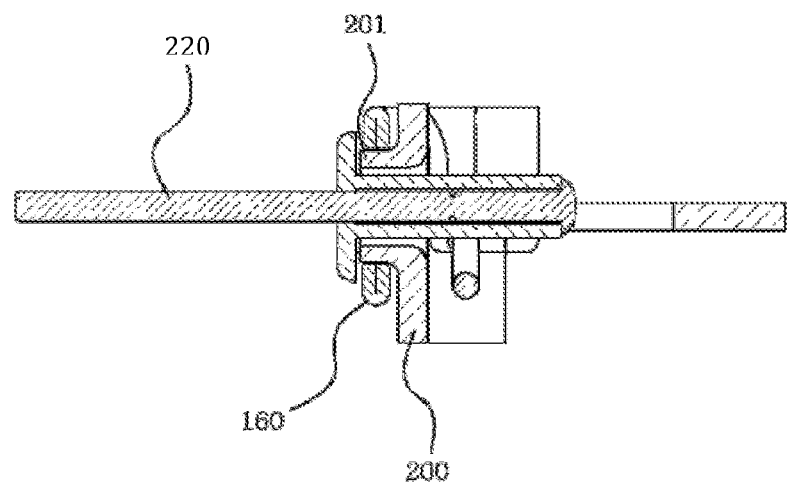
【Figure 10】
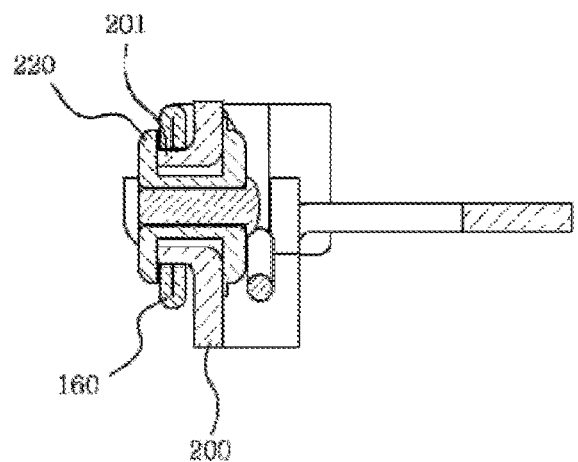

SEAT MOVING TRACK ASSEMBLY

TECHNICAL FIELD

The present invention relates to a seat moving track assembly for a vehicle, and more particularly, to a seat moving track assembly having a simple configuration and an improved stable locking configuration.

BACKGROUND ART

Related to a vehicle technology field, various shapes and configurations for a seat moving apparatus have been proposed and developed. Especially, recently, in the vehicle technology field including a seat technology, a lot of times and efforts are provided in developing a technology minimizing the number of components thereof while obtaining the substantially same effects as a conventional configuration or an more improved effect therethan.

Especially, related to a movement of a seat in a technology related to a seat moving track assembly, a technology about a track apparatus for smoothing the movement and a locking apparatus for stably coupling the seat to a track has been widely developed.

A patent related to these technologies is disclosed in Korean Patent First Publication No. 2004-55662. A seat moving assembly according to the patent includes a lower rail having a U shape section and an upper rail having a reverse U shape. The seat moving assembly includes a separate locking plate locking the upper rail and the lower rail so that the lower rail and the upper rail can be stably coupled. Concurrently, the position of the locking plate is allowed to be changed so that the lower rail and the upper rail can be easily coupled. However, since the patent uses the separate locking plate, the number of components of the seat moving assembly increases, and this increased number of the components fails to satisfy the current technology development tendency for improving a function with a decreased component number.

Another patent is disclosed in American Patent First Publication No. 2006-22502. A seat guide for a vehicle according to the patent includes upper and lower rails respectively having L shapes so that the number of components can be decreased. However, since the patent uses the upper and lower rails respectively having the L shapes, the manufacturing cost thereof is bigger than that of the conventional U shape rail. Also, since a single locking member is used, a coupling stability is deteriorated.

Accordingly, the present invention is to provide a seat moving track assembly solving the above problems, and having an improved stability with a simplified configuration.

DISCLOSURE

Technical Problem

It is an aspect of the present invention to provide a seat moving track assembly providing a stopping part to the opposite sides of a locking member to doubly couple a lower stationary rail and an upper moving rail, thereby further stably coupling both rails.

Another aspect of the present invention is to provide a seat moving track assembly varying the position of the stopping part formed to the opposite sides of the locking member, thereby minimizing deformation of the rails generated due to an external force.

Still another aspect of the present invention is to provide a seat moving track assembly providing an elastic member applying an elastic force to the locking member to a connecting member enabling a coupling between the locking member and an upper moving rail, thereby minimizing the number of components of the seat moving track assembly.

Technical Solution

The foregoing and/or other aspects of the present invention can be achieved by providing a seat moving track assembly, comprising: a lower stationary rail which comprises a channel configuration, and comprises an opening which is continuously formed in a uniform interval in a lengthwise direction to a first end part thereof, and a groove part which is continuously formed in a uniform interval in a lengthwise direction to a second end part thereof; an upper moving rail which comprises a channel configuration which is movably coupled with the lower stationary rail; a locking member which is connected to the upper moving rail to enable coupling and releasing between the upper moving rail and the lower stationary rail by means of a force which is applied from an external part; and an elastic member which is disposed inside the upper moving rail to apply a predetermined force to the locking member, the locking member comprising an input part which protrudes to receive the force applied from the external part, a first stopping part which protrudes to perform coupling and releasing with the opening which is formed to the lower stationary rail, and a second stopping part which bends toward the opposite side to a direction in which the input part and the first stopping part are formed, and extends in a predetermined length to perform coupling and releasing with the groove part of the lower stationary rail, and the first stopping part and the second stopping part which are formed to the opposite sides of the locking member being formed to different positions.

According to an aspect of the present invention, among the stopping parts which are formed to the opposite sides of the locking member, the first stopping part outwardly protrudes from a lower side of the locking member, and the second stopping part outwardly protrudes from an upper side of the locking member to be opposite to the direction of the first stopping part.

According to an aspect of the present invention, the locking member is coupled to the upper moving rail by means of a connecting shaft part which is put to be parallel with a lengthwise direction of the upper moving rail.

According to an aspect of the present invention, the elastic member comprises an elastic connecting member which is coupled to the upper moving rail to intermediate connecting of the locking member and the upper moving rail.

According to an aspect of the present invention, the elastic connecting member which couples the locking member and the upper moving rail is formed with a connecting hole which is coupled with the connecting shaft part of the locking member to enable rotation of the locking member.

According to an aspect of the present invention, the elastic connecting member which couples the locking member and the upper moving rail is integrally formed with an elastic pressing part which applies an elastic force to the locking member.

According to an aspect of the present invention, the lower stationary rail comprises a U shape channel configuration which comprises a bottom surface, and a first vertical surface which upwardly bends from the opposite end parts of the bottom surface, and comprises a first flat surface which inwardly extends from an end part of the first vertical surface in a predetermined length, and a first end surface which downwardly extends from an end part of the first flat surface in a predetermined length, the opening is continuously formed in a uniform interval in the lengthwise direction of the lower stationary rail to a part of two first end surfaces of the lower stationary rail, and the groove part is formed continuously in a uniform interval in the lengthwise direction between the first flat part and the first end surface which is formed to a part which faces the first end surface.

According to an aspect of the present invention, the bottom surface has a stair shape.

According to an aspect of the present invention, the upper moving rail comprises a reverse U shape channel configuration which comprises an upper surface, and a second vertical surface which downwardly bends from the opposite end parts of the upper surface, and comprises a second flat surface which outwardly extends from an end part of the second vertical surface in a predetermined length, and a second end surface which upwardly extends from an end part of the second flat surface in a predetermined length, a first through hole is provided to one of two second vertical surfaces of the upper moving rail to allow an input part of the locking member to protrude therethrough, a second through hole is provided between the second vertical surface and the second flat surface which is formed adjacently to the second vertical surface of the upper moving rail to allow the first stopping part of the locking member to penetrate therethrough, and a third through hole is provided on the second vertical surface which is formed to a part which faces the second vertical surface which is provided with the first through hole to allow the second stopping part of the locking member to penetrate therethrough.

According to an aspect of the present invention, a fourth through hole is provided on the second vertical surface of the upper moving rail to be adjacent to the second through hole, the elastic member comprises an elastic connecting member which is coupled to the upper moving rail to intermediate connecting of the locking member and the upper moving rail, and the elastic connecting member is inserted and supported to the fourth through hole by means of a coupling part which is formed to a position which corresponds to the fourth through hole.

According to an aspect of the present invention, an integral handle part is additionally provided to an external part to directly apply a force to the input part of the locking member.

According to an aspect of the present invention, the seat moving track assembly further comprises a seat connecting member which connects the upper moving rail to a seat side, wherein the handle part is formed with a hinge hole as a rotation center to a side thereof, and the seat connecting member is formed with a burring which is inserted to the hinge hole to rotatably support the handle part.

According to an aspect of the present invention, the handle part and the seat connecting member are coupled with each other by means of a coupling member by means of a blind riveting between the hinge hole and the burring.

The foregoing and/or other aspects of the present invention can be achieved by providing a seat moving track assembly, comprising: a lower stationary rail which comprises a channel configuration, and comprises an opening which is continuously formed in a uniform interval in a lengthwise direction to a first end part thereof; an upper moving rail which comprises a channel configuration which is movably coupled with the lower stationary rail; a locking member which is connected to the upper moving rail to enable coupling and releasing between the upper moving rail and the lower stationary rail by means of a force which is applied from an external part; and an elastic connecting member which is disposed inside the upper moving rail to intermediate connecting of the locking member and the upper moving rail, and applies a predetermined force to the locking member, the locking member comprising an input part which protrudes to receive the force applied from the external part, and a stopping part which protrudes to perform coupling and releasing with the opening which is formed to the lower stationary rail.

According to an aspect of the present invention, the elastic connecting member which couples the locking member and the upper moving rail is formed with a connecting hole which connects with a connecting shaft part of the locking member to enable rotation of the locking member.

Advantageous Effects

The seat moving track assembly according to the present invention simplifies the configuration of the locking member and the configuration of the rail corresponding thereto, thereby performing an improved stability, and substantially reducing the number of components in comparison with the conventional configuration.

Also, by means of the above configuration having the above technical advantages, a technical compatibility with the conventional technology can become convenient, and the deformation of the rail generated due to an external load can be minimized.

DESCRIPTION OF DRAWINGS

FIG. 1 is an external perspective view of a seat moving track assembly according to an exemplary embodiment of the present invention;

FIG. 2 is an exploded perspective view of the seat moving track assembly according to the exemplary embodiment of the present invention;

FIG. 3 is a perspective view of a locking member of the seat moving track assembly according to the exemplary embodiment of the present invention;

FIG. 4 is a perspective view of an elastic connecting member of the seat moving track assembly according to the exemplary embodiment of the present invention;

FIG. 5 is an enlarged partial view of a lower stationary rail of the seat moving track assembly according to the exemplary embodiment of the present invention;

FIG. 6 is a sectional view illustrating a case in which the locking member is coupled to the lower stationary rail in the seat moving track assembly according to the exemplary embodiment of the present invention;

FIG. 7 is a sectional view illustrating a case in which the locking member is withdrawn from the lower stationary rail in the seat moving track assembly according to the exemplary embodiment of the present invention;

FIG. 8 is an exploded partial perspective view illustrating a coupling process between a handle part and a seat connecting member in the seat moving track assembly according to the exemplary embodiment of the present invention; and FIGS. 9 and 10 are partial sectional views respectively illustrating states before and after the handle part and seat connecting member in FIG. 8 are connected with each other.

BEST MODE

Hereinafter, an exemplary embodiment of the present invention will be described by referring to the accompanying figures.

FIG. 1 is an external perspective view of a seat moving track assembly according to an exemplary embodiment of the present invention, FIG. 2 is an exploded perspective view of the seat moving track assembly according to the exemplary embodiment of the present invention, FIG. 3 illustrates a locking member of the seat moving track assembly according to the exemplary embodiment of the present invention, FIG. 4 illustrates an elastic connecting member of the seat moving track assembly according to the exemplary embodiment of the present invention, FIG. 5 is an enlarged partial view of a lower stationary rail of the seat moving track assembly according to the exemplary embodiment of the present invention, FIG. 6 is an operating view illustrating a case in which the locking member is coupled in the seat moving track assembly according to the exemplary embodiment of the present invention, and FIG. 7 is an operating view illustrating a case in which the locking member is withdrawn in the seat moving track assembly according to the exemplary embodiment of the present invention.

As described above, the present exemplary embodiment simplifies configurations of the locking member used to the seat moving track assembly, and upper and lower rails corresponding thereto so that the number of components used to the assembly can be minimized, and concurrently deformation of each component of the assembly generated due to an external load can be minimized. Hereinafter, a detailed configuration of the present exemplary embodiment will be described by referring to the accompanying figures.

At first, the present exemplary embodiment will be described by referring to FIG. 1 illustrating an external perspective view of the seat moving track assembly, and FIG. 2 illustrating an exploded perspective view thereof.

A seat moving track assembly 100 according to the present exemplary embodiment includes a lower stationary rail 110 having a channel configuration and provided with an opening 150 formed continuously in a uniform interval in a lengthwise direction to a first end thereof and a groove part 230 formed continuously in a uniform interval in the lengthwise direction to a second end thereof, an upper moving rail 120 having a channel configuration movably coupled with the lower stationary rail 110, a locking member 130 connected to the upper moving rail 120 to perform coupling and releasing between the upper moving rail 120 and the lower stationary rail 110, and an elastic member disposed inside the upper moving rail 120 to apply a predetermined force to the locking member 130.

More in detail, a gliding member 180 is provided between the upper stationary rail 110 and the upper moving rail 120 to smooth movement of the rails 110 and 120, and the locking member 130 is coupled to the upper moving rail 120 by means of an elastic connecting member 170 which is a separate connecting member. Also, the upper moving member 120 is connected to a seat side by means of a seat connecting member 200 coupled to an upper part thereof, and applies an external force to the locking member 130 by means of a handle part 160 provided to an external part thereof.

As shown in FIGS. 2 and 8, a hinge hole 161 which is a rotation center is formed to a side of the handle part 160, and a burring 201 protrudes from the seat connecting member 200 to correspond to the hinge hole 161. A protruding surrounding surface of the burring 201 is inserted to the hinge hole 161 so that the handle part 201 can be rotatably supported to the seat connecting member 200.

FIG. 8 is an exploded perspective view illustrating a state before coupling of the handle part 160 and the seat connecting member 200, and the coupling of the both is performed by means of a blind rivet 220 That is, as shown in FIG. 9, the burring 201 of the handle part 160 is inserted to the seat connecting member 200, and then the blind rivet 220 is inserted to the burring 201. Then, a left end part of the blind rivet 220 is pulled in an arrow direction to perform a blind riveting. FIG. 10 is a partial sectional view illustrating a result of the blind riveting. The blind rivet 220 in FIG. 9 is converted into a coupling member 220 by means of the blind riveting.

As describe above, the burring 201 is formed to the seat connecting member 200, and the handle part 160 and the seat connecting member 200 are coupled by means of the blind riveting, thereby maintaining the function of the handle part 160 needing rotatable coupling while reducing the number of components embodying theses. Also, a relative rotatable coupling between the handle part 160 and the seat connecting member 200 is performed by means of the blind riveting which is a relatively simple work, thereby reducing a total manufacturing time.

As shown in FIG. 8, the handle part 160 is an integral handle part which is integrally formed from a handle portion of a left side end part to a right side end part coupled to the seat connecting member 200, and manufacturing of the seat moving track assembly according to the present exemplary embodiment can be further convenient by means of the integral handle part 160. The integral handle part 160 directly applies a force to the locking member 130 depending on an operation of a user (referring to FIG. 7).

Each component of the seat moving track assembly 100 according to the present exemplary embodiment will be described more in detail by referring to related figures.

As shown in FIGS. 2, 5 and 6, the lower stationary rail 110 according to the present exemplary embodiment has a U shape channel configuration including a bottom surface 110a and a first vertical surface 110b upwardly bending from the opposite end parts of the bottom surface 110a, and includes a first flat surface 110c inwardly extending from the opposite end parts of the first vertical surface 110b to have a predetermined length, and a first end surface 110d downwardly extending from an end part of the first flat surface 110c to have a predetermined length. In the present exemplary embodiment, the bottom surface 110a of the lower stationary rail 110 has a stair shape so that a resistance against bending of the lower stationary rail 110 due to an external force by means of a forward and backward vibration of the seat, etc. can be improved. Also, since the bottom surface 110a of the lower stationary rail 110 is formed in the stair shape, movement of the upper moving rail 120 by means of coupling against the lower stationary rail 110 can be smoothly performed.

In the present exemplary embodiment, the lower stationary rail 110 is provided with a serrate opening 150 continuously formed in a uniform interval in a lengthwise direction of the rail to a predetermined portion of the first end surface 110d of a left side among the two first end surfaces 110d. The opening 150 is a space for enabling a first stopping part 130b of the locking member 130 to be coupled and released to and from the lower stationary rail 110. Also, the groove part 230 is continuously formed in a uniform interval in the lengthwise direction between the first end surface 110d formed to a right side facing the first end surface 110d formed to the left side and the first flat surface 110c. The groove part 230 is a space for enabling a second stopping part 130c of the locking member 130 to be coupled and released to and from the lower stationary rail 110. As described above, the opening 150 and the groove part 230 formed to the lower stationary rail 110 do not have defined shape, arrangement and number, and may have various shapes, arrangements and numbers.

Referring to FIGS. 2, 3 and 6, the locking member 130 according to the present exemplary embodiment will be described in detail.

The locking member 130 according to an exemplary embodiment an input part 130a protruding upwardly in a predetermined length with respect to a body 130*d* of the locking member 130 to receive a force applied from an external part, and the first stopping part 130*b* downwardly protruding in a predetermined length to perform coupling and releasing against the opening 150 formed to the lower stationary rail 110. The input part 130*a* and the first stopping part 130*b* respectively have angles which are the same or bigger than 90 with respect to the body 130*d*. Especially, in the present exemplary embodiment, the input part 130*a* and the first stopping part 130*b* formed to the locking member 130 respectively have obtuse angles bigger than 90 from the body 130*d*, and this is for enabling the coupling and releasing of the upper moving rail 120 and the lower stationary rail 110 although the size of a force applied an external part by means of the input part 130*a* of the locking member 130 is not big. The angle of the input part 130*a* and the first stopping part 130*b* provided to the locking member 130 may be freely adjusted as long as the coupling of the upper moving rail 120 and the lower stationary rail 110 maintains stability.

Also, the locking member 130 according to the present invention has the following distinguished configuration to improve stability of the seat moving track assembly 100.

In detail, as shown in the figures, the locking member 130 according to the present invention is formed with the second stopping part 130*c* formed to the opposite portion to the direction in which the input part 130*a* and the first stopping part 130*b* of the locking member 130 are formed, and outwardly bending from the body 130*d* to extend in a predetermined length. The second stopping part 130*c* is directly coupled with the groove part 230 continuously formed in the lengthwise direction in a uniform interval between the first end surface 110*d* formed to the right side of the lower stationary rail 110 and the first flat surface 110*c*.

That is, the locking member 130 according to the present invention enables the first stopping part 130*b* and the second stopping part 130*c* to be respectively formed to the opposite sides with respect to the body 130*d* to be respectively coupled to the opening 150 and the groove part 230 of the lower stationary rail 110, thereby performing a double coupling so that the upper moving rail 120 and the lower stationary rail 110 can be more stably coupled. Especially, in the present invention, the double coupling is performed just by means of the simple transforming of the protruding shape of the locking member 130 and the simple configuration transforming of the rails 110 and 120 corresponding thereto.

Also, in the locking member 130 according to the present invention, the positions of the first stopping part 130*b* and the second stopping part 130*c* are different. In detail, in an exemplary embodiment of the present invention, the first stopping part 130*b* is formed to outwardly protrude from a lower side of the locking member 130, and the second stopping part 130*c* is formed to outwardly protrude from an upper side of the locking member 130. That is, in the present invention, the positions of the stopping parts 130*b* and 130*c* are different from each other, thereby minimizing deformation between the rails 110 and 120 and the locking member 130 generated if an external load is applied to the locking member 130.

In general, in the lower stationary rail 110 having the channel shape, an end part of the U shape channel may get wider outwardly and be deformed due to continuous coupling and releasing against the lower stationary rail 110, and this deformation makes the coupling between the locking member 130 and the lower stationary rail 110 difficult. However, in the present invention, as shown in FIGS. 6 and 7, the respective stopping parts 130*b* and 130*c* of the locking member 130 have different positions to be coupled with the lower stationary rail 110 by means of the double coupling. Accordingly, although a predetermined deformation is generated between the first stopping part 130*b* and the lower stationary rail 110, the deformation is capable of being reduced by means of the coupling between the second stopping part 130*c* and the lower stationary rail 110, thereby solving the conventional problems due to deformation of the rails.

That is, the distinguished technical property of the present invention is not only obtained by means of the double coupling of the locking member 130, but also obtained by varying the positions of the stopping parts 130*b* and 130*c* formed to the locking member 130 and varying the positions of the opening 150 and the groove part 230 of the lower stationary rail 110 coupled with the locking member 130. Also, a apparent technical advantage of the present invention described above is that the conventional U shape channel is still available without component increase.

The numbers of the input part 130*a*, the first stopping part 130*b* and the second stopping part 130*c* protruding from the locking member 130 may be respectively more than one, and may be freely changed. Also, the shapes and dispositions of the input part 130*a*, and the protruding parts 130*b* and 130*c* of the locking member 130 are not defined, and may be freely changed.

The locking member 130 is coupled to the upper moving rail 120. As shown in the figures, the locking member 130 according to the present exemplary embodiment is coupled by means of the elastic connecting member 170 which is a separate connecting member. That is, the elastic connecting member 170 is coupled to the upper moving rail 120, and intermediates the connecting of the locking member 130 and the upper moving rail 120. A detailed shape of the elastic connecting member 170 according to the present exemplary embodiment is illustrated in FIG. 4. As shown in FIG. 4, a connecting shaft part 130*e* of the locking member 130 is coupled to a connecting hole 170*a* formed to the elastic connecting member 170. That is, the connecting shaft part 130*e* of the locking member 130 is coupled to the connecting hole 170*a* of the connecting member 170 so that the locking member 130 can rotate about a shaft (shaft formed by means of the connecting shaft part 130*e*) formed horizontally to the upper moving rail 120.

Also, the elastic connecting member 170 is integrally formed with an elastic pressing part 170*b* for applying an elastic force to the locking member 130. That is, the present invention additionally provides a composing portion applying the elastic force to the elastic connecting member 170 itself instead of using a separate member such as a spring, etc. to apply an elastic force to the locking member, thereby reducing the number of components in comparison with the conventional seat moving track assembly. In detail, as shown in FIGS. 4, 6 and 7, the elastic pressing part 170*b* is integrally formed to the elastic connecting member 170 to directly apply the elastic force to the locking member 130, thereby reducing the number of components. As shown therein, since the elastic pressing part 170*b* according to the present invention is disposed to press the locking member 130 in a downward direction in an inner space of the upper moving rail 120, the first stopping part 130*b* and the second stopping part 130*c* of the locking member 130 are respectively coupled with the opening 150 and the groove part 230 formed to the lower stationary rail 110 so that the upper moving rail 120 and the lower stationary rail 110 can be coupled each other if no external force is applied to the locking member 130.

As described above, the locking member 130 is coupled to the upper moving rail 120 by means of the elastic connecting member 170. More in detail about the upper moving rail 120, as shown in FIGS. 2 and 6, the upper moving rail 120 has a reverse U shape channel confirmation including an upper surface 120a and a second vertical surface 120b downwardly bending from the opposite end parts of the upper surface 120a, and includes a second flat surface 120c outwardly extending from the opposite end parts of the second vertical surface 120b in a predetermined length and a second end surface 120d upwardly extending from an end part of the second flat surface 120c in a predetermined length.

A first through hole 190a is provided to the second vertical surface 120b formed to a left side in the figure among the two vertical surfaces 120b of the upper moving rail 120 so that the input part 130a of the locking member 130 can protrude to the outside, and a second through hole 190b is provided between the second flat surface 120c formed adjacently to the second vertical surface 120b of the upper moving rail 120, and the second vertical surface 120b so that the first stopping part 130b of the locking member 130 can penetrate therethrough. Also, a third through hole 190c is provided on the second vertical surface 190b facing the second vertical surface 120b provided with the first through hole 190a so that the second stopping part 130c of the locking member 130 can penetrate therethrough.

Also, as shown in FIG. 2, a fourth through hole 190d formed adjacently to the second through hole 190c is provided to the second vertical surface 120b of the upper moving rail 120. For this, as shown in FIG. 4, a coupling part 170c is formed to the elastic connecting member 170 to a position corresponding to the fourth through hole 190d.

Accordingly, when the elastic connecting member 170 is coupled to the upper moving rail 120, at first, if the coupling part 170c is positioned to a position corresponding to the fourth through hole 190d after being inserted from a lower side of the upper moving rail 120, this is widened outwardly to be inserted and engaged to the fourth through hole 190d, thereby being coupled and supported to the upper moving rail 120.

By means of the above coupling type between the elastic connecting member 170 and the upper moving rail 120, a separate coupling component is not necessary, and a manufacturing speed is improved.

The elastic connecting member 170 may be coupled to the upper moving rail 120 without employing the above coupling type in which the coupling part 170c is inserted to the fourth through hole 190d. Alternatively, a through hole may be formed through an upper surface thereof, a through hole may be formed through an upper surface of the upper moving rail 120 to correspond thereto, and these may be coupled each other by means of a bolt, a rivet, etc. to be coupled to the upper moving rail 120.

The locking member 130 coupled with the upper moving rail 120 is capable of rotating by means of a force applied from an external part. In the present exemplary embodiment, as shown in FIGS. 1 and 2, the force of the external part is applied to the locking member 130 through an up and down movement of the handle part 160. In detail, as shown in FIGS. 2 and 7, in the present exemplary embodiment, an external force is applied to the input part 130a of the locking member 130 by means of a handle end part formed to an end part of the handle part 160 so that the locking member 130 can rotate about the shaft.

Here, the handle part 160 is coupled to a spring member 140 by means of the coupling member 220 to be formed to the seat connecting member 200. This configuration enables the up and down movement of the handle part 160.

A detailed operation of the seat moving track assembly according to the present invention is illustrated in FIGS. 6 and 7. FIG. 6 illustrates a state in which a force from the outside is not applied, that is, the upper moving rail 110 is coupled to the lower stationary rail 120 by means of the locking member 130, and FIG. 7 illustrates a state in which the external force is applied to the locking member 130 by means of the handle part 160, and the upper moving rail 120 is released from the lower stationary rail 110.

The operation of the seat moving track assembly 100 according to the present invention will be described in detail by referring thereto.

At first, as shown in FIG. 6, the locking member 130 is applied with only a force pressing the locking member 130 downwardly by means of the elastic pressing part 170b of the elastic connecting member 170. In this case, as shown therein, the first stopping part 130b of the locking member 130 is stationary by means of the second through hole 190b of the upper moving rail 120 and the opening 150 of the lower stationary rail 110 so that the upper moving rail 120 and the lower stationary rail 110 can be coupled with each other. Also, the second stopping part 130c of the locking member 130 couples the upper moving rail 120 and the lower stationary rail 110 by means of the third through hole 190c of the upper moving rail 120 and the groove part 230 of the lower stationary rail 110, thereby doubly coupling the two rails 110 and 120.

However, as shown in FIG. 7, if a force is applied through the handle end part 160a of the handle part 160 so that the handle end part 160a can push the input part 130a of the locking member 130 downwardly, the first stopping part 130b of the locking member 130 rotates in a rightward and downward direction with respect to the connecting shaft part 130e, and the second stopping part 130c of the locking member 130 rotates in a leftward and upward direction with respect to the connecting shaft 130e so that the upper moving rail 120 can be released from the lower stationary rail 110.

That is, as described above, the present invention embodies the seat moving track assembly 100 by means of the simple transformation of the locking member 130, and the lower stationary rail 110 and the upper moving rail 120 corresponding thereto, thereby stably and effectively performing coupling of the seat moving track. Especially, the positions of the stopping parts 130b and 130c formed to the locking member 130 are provided to be different, thereby minimizing deformation generated to the rails 110 and 120 due to an external load, and problems caused by the deformation.

As shown in the figures, a guiding ball 180a and a roller 180b of the gliding member 180 are provided between the upper moving rail 120 and the lower stationary rail 110, thereby performing a smooth gliding.

Also, in the present exemplary embodiment, the first stopping part 130b and the second stopping part 130c are all provided to the locking member 130. Alternatively, one of the two stopping parts 130b and 130c may be provided for the locking of the locking member 130. For example, only the first stopping part 130b may be provided to the locking member 130.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

The invention claimed is:

1. A seat moving track assembly, comprising:
   a lower stationary rail which comprises a channel configuration, and comprises an opening which is continuously formed in a uniform interval in a lengthwise direction to a first end part thereof, and a groove part which is continuously formed in a uniform interval in a lengthwise direction to a second end part thereof;

an upper moving rail which comprises a channel configuration which is movably coupled with the lower stationary rail;

a locking member which is connected to the upper moving rail to enable coupling and releasing between the upper moving rail and the lower stationary rail by means of a force which is applied from an external part; and an elastic member which is disposed inside the upper moving rail to apply a predetermined force to the locking member, the locking member comprising an input part which protrudes to receive the force applied from the external part, a first stopping part which protrudes to perform coupling and releasing with the opening which is formed to the lower stationary rail, and a second stopping part which bends toward the opposite side to a direction in which the input part and the first stopping part are formed, and extends in a predetermined length to perform coupling and releasing with the groove part of the lower stationary rail, and the first stopping part and the second stopping part which are formed to the opposite sides of the locking member being formed to different positions.

2. The seat moving track assembly according to claim 1, wherein, among the stopping parts which are formed to the opposite sides of the locking member, the first stopping part outwardly protrudes from a lower side of the locking member, and the second stopping part outwardly protrudes from an upper side of the locking member to be opposite to the direction of the first stopping part.

3. The seat moving track assembly according to claim 1, wherein the locking member is coupled to the upper moving rail by means of a connecting shaft part which is put to be parallel with a lengthwise direction of the upper moving rail.

4. The seat moving track assembly according to claim 1, wherein the elastic member comprises an elastic connecting member which is coupled to the upper moving rail to intermediate connecting of the locking member and the upper moving rail.

5. The seat moving track assembly according to claim 4, wherein the elastic connecting member which couples the locking member and the upper moving rail is formed with a connecting hole which is coupled with the connecting shaft part of the locking member to enable rotation of the locking member.

6. The seat moving track assembly according to claim 4, wherein the elastic connecting member which couples the locking member and the upper moving rail is integrally formed with an elastic pressing part which applies an elastic force to the locking member.

7. The seat moving track assembly according to claim 1, wherein the elastic connecting member which couples the locking member and the upper moving rail is integrally formed with an elastic pressing part which applies an elastic force to the locking member.

8. The seat moving track assembly according to claim 1, wherein the lower stationary rail comprises a U shape channel configuration which comprises a bottom surface, and a first vertical surface which upwardly bends from the opposite end parts of the bottom surface, and comprises a first flat surface which inwardly extends from an end part of the first vertical surface in a predetermined length, and a first end surface which downwardly extends from an end part of the first flat surface in a predetermined length, the opening is continuously formed in a uniform interval in the lengthwise direction of the lower stationary rail to a part of two first end surfaces of the lower stationary rail, and the groove part is formed continuously in a uniform interval in the lengthwise direction between the first flat part and the first end surface which is formed to a part which faces the first end surface.

9. The seat moving track assembly according to claim 8, wherein the bottom surface has a stair shape.

10. The seat moving track assembly according to claim 1, wherein the upper moving rail comprises a reverse U shape channel configuration which comprises an upper surface, and a second vertical surface which downwardly bends from the opposite end parts of the upper surface, and comprises a second flat surface which outwardly extends from an end part of the second vertical surface in a predetermined length, and a second end surface which upwardly extends from an end part of the second flat surface in a predetermined length, a first through hole is provided to one of two second vertical surfaces of the upper moving rail to allow an input part of the locking member to protrude therethrough, a second through hole is provided between the second vertical surface and the second flat surface which is formed adjacently to the second vertical surface of the upper moving rail to allow the first stopping part of the locking member to penetrate therethrough, and a third through hole is provided on the second vertical surface which is formed to a part which faces the second vertical surface which is provided with the first through hole to allow the second stopping part of the locking member to penetrate therethrough.

11. The seat moving track assembly according to claim 10, wherein a fourth through hole is provided on the second vertical surface of the upper moving rail to be adjacent to the second through hole, the elastic member comprises an elastic connecting member which is coupled to the upper moving rail to intermediate connecting of the locking member and the upper moving rail, and the elastic connecting member is inserted and supported to the fourth through hole by means of a coupling part which is formed to a position which corresponds to the fourth through hole.

12. The seat moving track assembly according to claim 1, wherein an integral handle part is additionally provided to an external part to directly apply a force to the input part of the locking member.

13. The seat moving track assembly according to claim 12, further comprising a seat connecting member which connects the upper moving rail to a seat side, wherein the handle part is formed with a hinge hole as a rotation center to a side thereof, and the seat connecting member is formed with a burring which is inserted to the hinge hole to rotatably support the handle part.

14. The seat moving track assembly according to claim 13, wherein the handle part and the seat connecting member are coupled with each other by means of a coupling member by means of a blind riveting between the hinge hole and the burring.

15. A seat moving track assembly, comprising:

a lower stationary rail which comprises a channel configuration, and comprises an opening which is continuously formed in a uniform interval in a lengthwise direction to a first end part thereof;

an upper moving rail which comprises a channel configuration which is movably coupled with the lower stationary rail;

a locking member which is disposed inside the upper moving rail and connected to the upper moving rail to enable coupling and releasing between the upper moving rail and the lower stationary rail by means of a force which is applied from an external part; and an elastic connecting member which is disposed inside the upper moving rail to intermediate connecting of the locking member and the upper moving rail, and applies a predetermined force to the locking member, the locking member comprising an input part which protrudes to receive the force applied from the external part, and a stopping part which protrudes to perform coupling and releasing with the opening which is formed to the lower stationary rail, the elastic connecting member which couples the locking member and the upper moving rail is formed with a connecting hole which connects with a connecting shaft part of the locking member to enable rotation of the locking member.

\* \* \* \* \*